United States Patent
Arikawa et al.

(10) Patent No.: US 11,206,081 B2
(45) Date of Patent: Dec. 21, 2021

(54) OPTICAL SPACE COMMUNICATION SYSTEM, OPTICAL RECEPTION DEVICE, OPTICAL RECEPTION METHOD, AND NON-TRANSITORY COMPUTER READABLE MEDIUM

(71) Applicant: NEC Corporation, Tokyo (JP)

(72) Inventors: Manabu Arikawa, Tokyo (JP); Toshiharu Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/044,213

(22) PCT Filed: Mar. 22, 2019

(86) PCT No.: PCT/JP2019/012087
§ 371 (c)(1),
(2) Date: Sep. 30, 2020

(87) PCT Pub. No.: WO2019/198465
PCT Pub. Date: Oct. 17, 2019

(65) Prior Publication Data
US 2021/0159976 A1    May 27, 2021

(30) Foreign Application Priority Data
Apr. 12, 2018    (JP) ............... JP2018-076849

(51) Int. Cl.
*H04B 10/11* (2013.01)
*H04J 14/06* (2006.01)

(52) U.S. Cl.
CPC .............. *H04B 10/11* (2013.01); *H04J 14/06* (2013.01)

(58) Field of Classification Search
CPC combination set(s) only.
See application file for complete search history.

(56) References Cited

U.S. PATENT DOCUMENTS

2003/0134664 A1* 7/2003 Zancewicz ............... H01Q 3/26
                                                                455/562.1
2010/0003028 A1* 1/2010 Zhang .................... H04B 10/61
                                                                398/65

(Continued)

FOREIGN PATENT DOCUMENTS

JP    2016-139977 A    8/2016

OTHER PUBLICATIONS

T. Imai, "Polarization diversity receiver using a simple weight controller for coherent lightwave systems," 1988 Fourteenth European Conference on Optical Communication, ECOC 88 (Conf. Publ. No. 292), 1988, pp. 159-162 vol. 1.*
International Search Report dated Jun. 6, 2019, in corresponding PCT International Application.
Arikawa et al., "Mitigation of Fading Caused by Atmospheric Turbulence with FMF Coupling and Maximum Ratio Combining Used in 320-M Free-Space Optical Transmission of 10 Gb/s BPSK", ECOC 2016, 3 pages, Sep. 2016.

(Continued)

*Primary Examiner* — Tanya T Motsinger

(57) ABSTRACT

An optical reception terminal includes a plurality of matrix filters (40, 41) respectively provided for a plurality of modes and configured to perform polarization separation and equalization on a coherently received signal in a corresponding mode, and two combining filters (50, 51) respectively provided for two polarizations and configured to combine signals in corresponding polarization among signals output from the plurality of matrix filters (40, 41) after weighting the signals. Filter coefficients of the plurality of matrix filters (40, 41) and weighting coefficients of the two combining filters (50, 51) are controlled based on a deviation from a desired state of both signals in two polarizations after combining by the two combining filters (50, 51), so as to minimize a sum of deviations.

16 Claims, 9 Drawing Sheets

(56) References Cited

U.S. PATENT DOCUMENTS

| | | | |
|---|---|---|---|
| 2012/0045208 A1* | 2/2012 | Yasuda | H04L 27/223 398/65 |
| 2012/0084619 A1* | 4/2012 | Kuschnerov | H04J 14/06 714/752 |
| 2012/0308227 A1* | 12/2012 | Komaki | H04B 10/2569 398/25 |
| 2013/0251370 A1* | 9/2013 | Ogasahara | H04B 10/6162 398/65 |
| 2014/0328585 A1* | 11/2014 | Arikawa | H04B 10/6162 398/25 |
| 2016/0241341 A1* | 8/2016 | Endo | H04B 10/612 |
| 2016/0294480 A1* | 10/2016 | Mertz | H04B 10/6163 |
| 2018/0034552 A1* | 2/2018 | Oyama | G02B 6/12009 |
| 2019/0020409 A1* | 1/2019 | Le Taillandier De Gabory | H04B 10/07957 |
| 2019/0334627 A1* | 10/2019 | Kaneda | H04B 10/65 |
| 2020/0119814 A1* | 4/2020 | Binkai | H04B 10/6166 |
| 2020/0295843 A1* | 9/2020 | Su | H04B 10/079 |
| 2021/0159976 A1* | 5/2021 | Arikawa | H04B 10/61 |
| 2021/0218476 A1* | 7/2021 | Masuda | H04B 10/07951 |

OTHER PUBLICATIONS

Geisler et al., "Multi-aperture digital coherent combining for free-space optical communication receivers", Optics Express, Jun. 2016, vol. 24, No. 12, pp. 12661-12671.

M. Arikawa et al., "Evaluation of Blind Diversity Combining of Severely Faded Signals for High-Speed Free-Space Optical Communication Under Atmospheric Turbulence", ECOC 2017, Opt. Express 24, 12661 (2016), 3 pages, Sep. 2017.

Kim et al. "Electronic Wavefront Correction for PSK Free-Space Optical Communications", Electronics Letters, Oct. 2007, vol. 43, No. 20, pp. 1108-1109.

Randel et al., "Complexity Analysis of Adaptive Frequency-Domain Equalization for MIMO-SDM Transmission", 3 pages, ECOC 2013, Th.2.C.4.

K. Hosokawa et al., "Free-space Optical Receiver using SDM Technique to Overcome Atmosphere Turbulence", The Space Sciences and Technology Conference No. 59, 1H16, 5 pages, (2015).

* cited by examiner

OPTICAL SPACE COMMUNICATION SYSTEM, OPTICAL RECEPTION DEVICE, OPTICAL RECEPTION METHOD, AND NON-TRANSITORY COMPUTER READABLE MEDIUM

CROSS-REFERENCE TO RELATED PATENT APPLICATIONS

This application is a National Stage Entry of International Application No. PCT/JP2019/012087, filed Mar. 22, 2019, which claims priority from Japanese Patent Application No. 2018-076849, filed Apr. 12, 2018. The entire contents of the above-referenced applications are expressly incorporated herein by reference.

TECHNICAL FIELD

The present disclosure relates to an optical space communication system and, particularly, relates to digital signal processing for receiving a dual-polarization signal in a plurality of modes with spatially different characteristics and performing diversity combining in an optical space communication system.

BACKGROUND ART

With growing expectations for the utilization of observation data for earth observation provided from an air vehicle in the sky such as a satellite, an increase in the capacity of a communication system that sends the observation data to the ground is becoming increasingly significant today. The existing microwave communication has limitations to meet the demand for an increase in capacity due to severe legal and physical constraints on bandwidth usage. In view of this, optical space communication capable of achieving an increase in capacity without practical constraints on bandwidth is attracting attention. Further, since optical space communication uses light with shorter wavelength and higher directivity compared with microwave communication, it is expected to reduce the size and weight of a transmitter and a receiver, reduce the interception probability, reduce the interference between a plurality of systems operating simultaneous, and so on.

In the case of performing high-speed optical space communication, most of currently available wide-band receivers are devices based on Single Mode Fiber (SMF). Thus, to achieve high-speed optical space communication between a satellite and the ground, for example, an optical signal that has been transmitted from a satellite or the like and propagated through the air needs to be coupled to an SMF. However, the core diameter of a typical SMF is as small as 10 μm, and when the optical signal that has been propagated through the space is affected by wavefront disturbance due to atmospheric turbulence, significant variation and degradation occurs in coupling efficiency to the SMF, which causes fading.

One promising approach to combat the fading due to atmospheric turbulence is use of a diversity reception scheme using a plurality of receivers. If the effect of atmospheric turbulence on optical signals is different for each optical signal input to each receiver, by performing diversity combining that selects the best one from a plurality of optical signals respectively input to a plurality of receivers or, more generally, combines a plurality of optical signals, the probability of fading of an optical signal after the diversity combining is reduced.

Non Patent Literature 1 discloses the structure of a mode diversity optical space communication receiver that collects optical beams on a few-mode fiber having a plurality of propagation modes and performs diversity combining by digital signal processing. In the optical space communication receiver disclosed in Non Patent Literature 1, optical signals are respectively coupled to a plurality of propagation modes with spatially different characteristics of the few-mode fiber through a mode separator, each of the optical signals is guided to an SMF and received in a coherent way by an SMF-based receiver, and then the optical signals are diversity-combined by digital signal processing. Since the effect of atmospheric turbulence on the optical signal coupled to each propagation mode can be regarded as being independent for each propagation mode or varying in a complementary fashion, the effect of fading on the optical signal after combining is reduced by diversity effects.

Non Patent Literature 2 discloses the structure of a receiver that collects optical beams by a plurality of telescope apertures placed in spatially different locations, couples each of the optical beams to an SMF, and receives and combines the optical beams. In the receiver disclosed in Non Patent Literature 2 also, if the optical beams coupled to each SMF are regarded as one mode, the optical beam s are received in a plurality of modes with spatially different characteristics, and diversity combining is performed.

Maximal-ratio combining is known as one method of combining a plurality of received signals. The maximal-ratio combining combines a plurality of received signals after aligning the phases and weighting the signals by a weighting coefficient according to each characteristics, and outputs a combined result. When a plurality of received signals are weighted by appropriate weights according to their characteristics and combined, Signal to Noise Ratio (SNR) after combining is the sum of the SNR of each of the received signals before combining. Non Patent Literature 3 describes digital signal processing that performs maximal-ratio combining by a method based on blind adaptive equalization.

In the existing optical space communication systems including those disclosed in the above-described Non Patent Literatures, a single-polarization optical signal is used. In optical space communication between a satellite and the ground, while an extremely weak optical signal transmitted from a satellite is received, an optical signal or a beacon signal is transmitted from the ground to a satellite in some cases. Thus, one of main reasons to use a single-polarization optical signal in an optical space communication system is separating an optical signal to be transmitted and an optical signal to be received by a difference in polarization. However, in an optical space communication system that uses coherent detection for reception of an optical signal, the separation of optical signals is sufficiently achievable by a slight difference in wavelength, and it is not necessary to use single polarization. Therefore, an optical space communication system that uses coherent detection is capable of achieving a further increase in capacity by use of dual polarization, which is widely used also in an optical fiber communication system.

In a typical optical fiber, the polarization state of optical signals that propagate through an optical fiber varies by the pressure applied to the optical fiber or the like. When using the dual polarization, dual-polarization optical signals are mixed by the variation of the polarization state of the optical signals. Therefore, in a recent optical fiber communication system using the dual polarization, dual-polarization optical signals are separated by digital signal processing after coherent reception.

FIG. 1 is a view showing an example of the structure of a polarization separation filter 910 that is used in an optical fiber communication system. In the polarization separation filter 910, received signal $x_1$ in x-polarization and signal $x_2$ in y-polarization are input, and the input signals are polarization separated by filter processing using a 2×2 filter $h_{pq}$ represented by $h_{pq}$ (p=1, 2, q=1, 2). Outputs after this polarization separation are $y_1$ and $y_2$. An FIR (Finite Impulse Response) filter or a frequency domain filter may be used for the filter $h_{pq}$, and an $N_h$ tap T/2 FIR filter is used in this example.
When $$x_p^j = x_p[k-j+1], h_{pq}^j = h_{pq}[j]$$

(j=1, ..., $N_h$), and $$x_p = (x_p^1, \ldots, x_p^{N_h})^t, h_{pq} = (h_{pq}^1, \ldots, h_{pq}^{N_h})^t$$

(t: transpose),
the output $y_p$ is:

$$y_p = \sum_{j,q} h_{pq}^j x_q^j.$$

A filter coefficient of the filter $h_{pq}$ is updated by a method of adaptive equalization based on the deviation of the output $y_p$ from a desired state. The coefficient update amount is calculated using $y_p$ and $x_q$. In the case of Constant Modulus Algorithm (CMA), which is generally used for the polarization separation of dual-polarization QPSK (Quadrature Phase Shift Keying) signals, the coefficient update amount is updated to minimize the value of $\varepsilon_p^2$, which is the square of the deviation of the output $y_p$ from a desired state:

$$\varepsilon_p = 1 - |y_p|^2$$

The coefficient update rule is:

$$h_{pq} \rightarrow h_{pq} + \mu \varepsilon_p y_p x_p^*$$

By this coefficient control of the filter coefficient, the polarization separation is performed, and the compensation of polarization mode dispersion, the equalization of incompleteness of a receiver and so on are performed simultaneously.

In the case of using this dual polarization in combination with the diversity combining for reducing the effect of atmospheric turbulence, digital signal processing that simultaneously performs the polarization separation and the diversity combining is required. A direct way to perform this digital signal processing is a method that performs the polarization separation on received signals and then performs the diversity combining. FIG. 2 is a view showing an example of the structure of a digital signal processing unit that performs such digital signal processing (an example of 2-mode diversity combining of dual-polarization signals). A received signal $x_1$ in x-polarization and a received signal $x_2$ in y-polarization in Mode 1 are input to a polarization separation filter 911, and polarization separated signals are obtained. Further, a received signal $x_3$ in x-polarization and a received signal $x_4$ in y-polarization in Mode 2 are input to a polarization separation filter 912, and polarization separated signals are obtained. After that, the polarization separated signal in x-polarization in Mode 1 and the polarization separated signal in x-polarization in Mode 2 are input to a combining filter 921, and the polarization separated signal in y-polarization in Mode 1 and the polarization separated signal in y-polarization in Mode 2 are input to a combining filter 922. The combining filter 921 performs maximal-ratio combining that combines the signal in x-polarization in Mode 1 and the signal in x-polarization in Mode 2 after weighting them by weighting coefficients $w_{11}$ and $w_{12}$, respectively, and the combining filter 922 performs maximal-ratio combining that combines the signal in y-polarization in Mode 1 and the signal in y-polarization in Mode 2 after weighting them by weighting coefficients $w_{21}$ and $w_{22}$, respectively. The outputs of the combining filters 921 and 922 are $y_1$ and $y_2$, respectively. In FIG. 2, a method by the adaptive equalization is used as coefficient control of weighting coefficients. However, since this method performs the polarization separation independently for each mode, the polarization separation does not work when the characteristics of signals in x- and y-polarization received in each mode are low, and it fails to obtain a sufficient gain of the diversity combining.

Another way to perform the digital signal processing that simultaneously performs the polarization separation and the diversity combining is a method using a MIMO (Multiple Input Multiple Output) filter as used in multi-mode optical fiber communication disclosed in Non Patent Literature 4. FIG. 3 is a view showing an example of the structure of a digital signal processing unit that performs such digital signal processing (an example of 2-mode diversity combining of dual-polarization signals, which is the same as in FIG. 2). In a MIMO filter 930, a received signal $x_1$ in x-polarization and a received signal $x_2$ in y-polarization in Mode 1, and a received signal $x_3$ in x-polarization and a received signal $x_4$ in y-polarization in Mode 2 are input, and filter processing using a 2×4 filter $h_{pq}$ represented by $h_{pq}$ represented by $h_{pq}$ (p=1, 2, q=1, 2, 3, 4) is performed on the input signals, and $y_1$ and $y_2$ are output. When the filter $h_{pq}$ is an $N_h$ tap T/2 FIR filter, the output $y_p$ is:

$$y_p = \sum_q (h_{pq})^t \cdot x_q = \sum_{j,q} h_{pq}^j x_q^j$$

The coefficient update rule when controlling the filter coefficients of the filter $h_{pq}$ by CMA is:

$$h_{pq} \rightarrow h_{pq} + \mu \varepsilon_p y_p x_p^*$$

In FIG. 3, the polarization separation and the diversity combining are simultaneously performed by using the 2×4 filter $h_{pq}$ based on the deviation of the output $y_p$ from a desired state, and therefore the problem as described in FIG. 2 does not occur. However, when the number of modes to be combined is $N_d$, it is necessary to simultaneously control $4 \times N_h \times N_d$ number of filter coefficients for a large-scale filter, which is $N_h$ tap $2\times(2\times N_m)$ filter. Particularly, it is known that the effect of atmospheric turbulence in optical space communication between a satellite and the ground varies at a high rate of about kHz, and the control of filter coefficients needs to follow this variation. Rapid control of filter coefficients of a large-scale filter is thereby required; however, such rapid control is generally difficult. Further, although the degeneracy of the same signals at the output can occur in typical blind adaptive equalization that outputs a plurality of signals, it is difficult to take effective countermeasures to this problem.

CITATION LIST

Non Patent Literature

NPL1: Hosokawa, et al., "Free-space Optical Receiver using SDM Technique to Overcome Atmosphere Turbulence", the Space Sciences and Technology Conference No. 59, 1H16 (2015).
NPL2: D. J. Geisler et al., "Multi-aperture digital coherent combining for free-space optical communication receivers," Opt. Express 24, 12661 (2016).
NPL3: M. Arikawa et al., "Evaluation of Blind Diversity Combining of Severely Faded Signals for High-Speed Free-Space Optical Communication under Atmospheric Turbulence," ECOC 2017, Tu.2.E.5.
NPL4: S. Randel et al., "Complexity Analysis of Adaptive Frequency-Domain Equalization for MIMO-SDM Transmission," ECOC 2013, Th.2.C.4.

SUMMARY OF INVENTION

Technical Problem

As described above, when receiving dual-polarization signals in a plurality of modes with spatially different characteristics and performing diversity combining in an optical space communication system between a satellite and the ground or the like, the digital signal processing according to related art has a problem that coefficient control of filter coefficients of a large-scale filter is needed, and it is difficult to follow the variation of atmospheric turbulence.

An object of the present disclosure is to solve the above problem and provide a technique capable of rapidly following the variation of atmospheric turbulence in diversity combining of dual-polarization signals.

Solution to Problem

An optical space communication system according to one aspect includes an optical transmission device configured to transmit a dual-polarization signal, and an optical reception device configured to receive the dual-polarization signal transmitted from the optical transmission device in a plurality of modes with spatially different characteristics and perform diversity combining, wherein the optical reception device includes a plurality of dual-polarization coherent receivers respectively provided for the plurality of modes and configured to perform coherent reception on a signal coupled to a corresponding mode, a plurality of matrix filters respectively provided for a plurality of modes and configured to perform polarization separation and equalization on a signal coherently received by the coherent receiver in a corresponding mode, and two combining filters respectively provided for two polarizations in quadrature and configured to combine signals in corresponding polarization among signals output from the plurality of matrix filters after weighting the signals, and filter coefficients of the plurality of matrix filters and weighting coefficients of the two combining filters are controlled based on a deviation from a desired state of both signals in two polarizations after combining by the two combining filters, so as to minimize a sum of deviations.

An optical reception device according to one aspect is an optical reception device for receiving a dual-polarization signal transmitted from an optical transmission device in a plurality of modes with spatially different characteristics and performing diversity combining, including a plurality of dual-polarization coherent receivers respectively provided for the plurality of modes and configured to perform coherent reception on a signal coupled to a corresponding mode, a plurality of matrix filters respectively provided for a plurality of modes and configured to perform polarization separation and equalization on a signal coherently received by the coherent receiver in a corresponding mode, and two combining filters respectively provided for two polarizations in quadrature and configured to combine signals in corresponding polarization among signals output from the plurality of matrix filters after weighting the signals, wherein filter coefficients of the plurality of matrix filters and weighting coefficients of the two combining filters are controlled based on a deviation from a desired state of both signals in two polarizations after combining by the two combining filters, so as to minimize a sum of deviations.

An optical reception method according to one aspect is an optical reception method by an optical reception device for receiving a dual-polarization signal transmitted from an optical transmission device in a plurality of modes with spatially different characteristics and performing diversity combining, including performing coherent reception on a signal coupled to a corresponding mode for each of the plurality of modes, performing, by a plurality of matrix filters, polarization separation and equalization on a coherently received signal in a corresponding mode for each of a plurality of modes, and combining, by two combining filters, signals in corresponding polarization among signals output from the plurality of matrix filters after weighting the signals for each of two polarizations in quadrature, wherein filter coefficients of the plurality of matrix filters and weighting coefficients of the two combining filters are controlled based on a deviation from a desired state of both signals in two polarizations after combining by the two combining filters, so as to minimize a sum of deviations.

A non-transitory computer readable medium according to one aspect is a non-transitory computer readable medium storing a program causing an optical reception device for receiving a dual-polarization signal transmitted from an optical transmission device in a plurality of modes with spatially different characteristics and performing diversity combining to execute a step of performing coherent reception on a signal coupled to a corresponding mode for each of the plurality of modes, a step of performing, by a plurality of matrix filters, polarization separation and equalization on a coherently received signal in a corresponding mode for each of a plurality of modes, a combining step of combining, by two combining filters, signals in corresponding polarization among signals output from the plurality of matrix filters after weighting the signals for each of two polarizations in quadrature, a step of controlling filter coefficients of the plurality of matrix filters and weighting coefficients of the two combining filters based on a deviation from a desired state of both signals in two polarizations after combining by the two combining filters, so as to minimize a sum of deviations.

Advantageous Effects of Invention

According to the above aspects, there is provided a technique capable of rapidly following the variation of atmospheric turbulence in diversity combining of dual-polarization signals.

DESCRIPTION OF EMBODIMENTS

Example embodiments of the present disclosure will be described hereinafter with reference to the drawings. Note that the following description and the attached drawings are appropriately shortened and simplified to clarify the explanation. In the figures, the identical reference symbols denote identical structural elements and the redundant explanation thereof is omitted.

(1) First Example Embodiment

Figure 1:
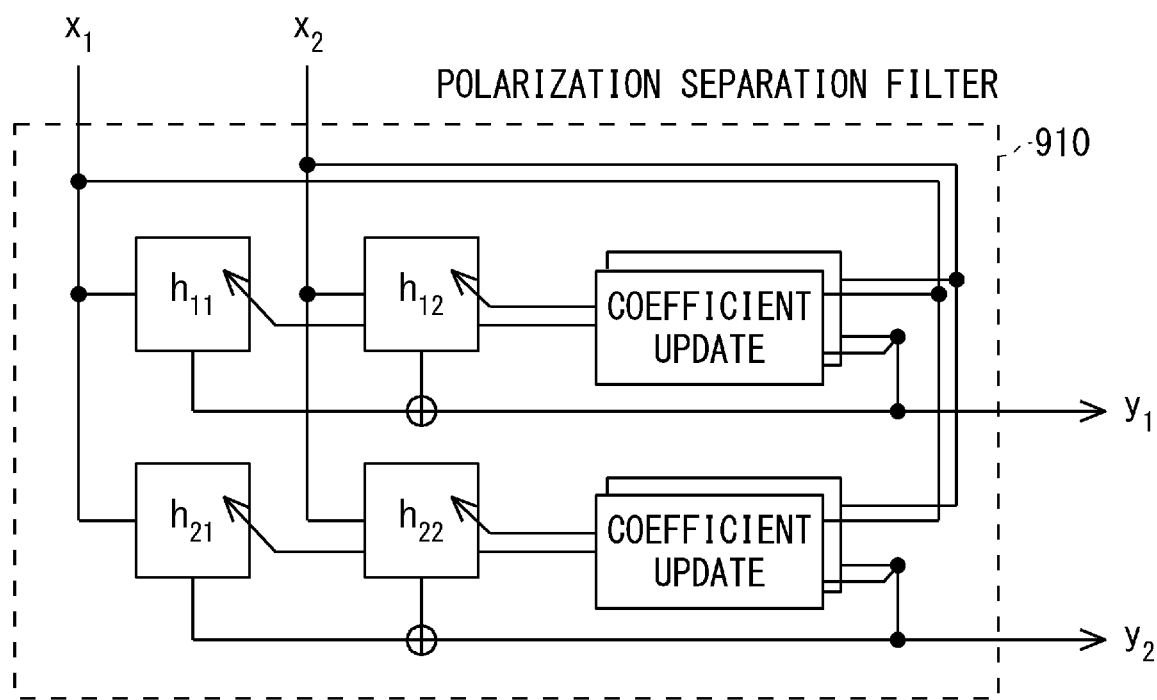
FIG. 1 is a view showing an example of the structure of a polarization separation filter according to related art.
Figure 2:
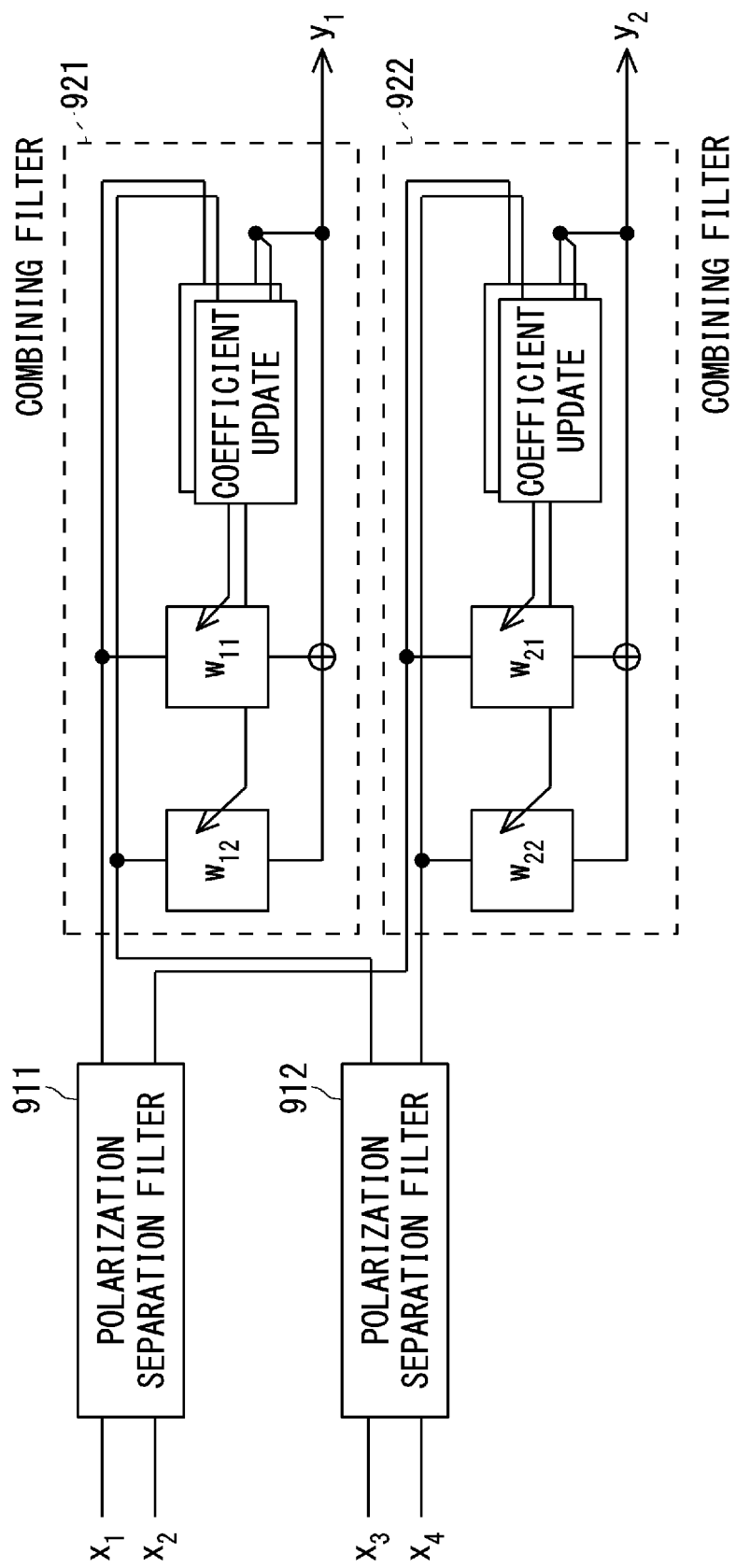
FIG. 2 is a view showing an example of the structure of a digital signal processing unit that performs polarization separation and diversity combining according to related art.
Figure 3:
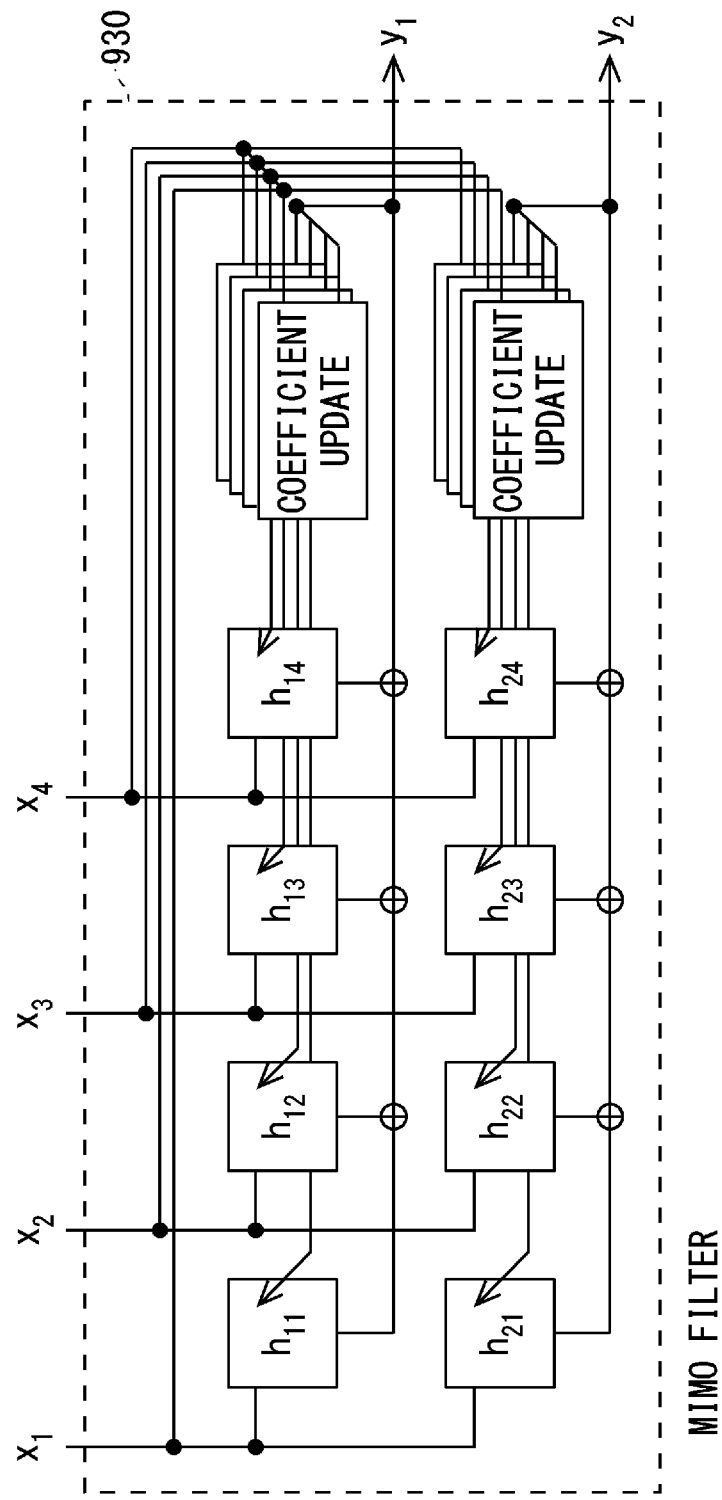
FIG. 3 is a view showing an example of the structure of a digital signal processing unit that performs polarization separation and diversity combining by using a MIMO filter according to related art.
Figure 4:
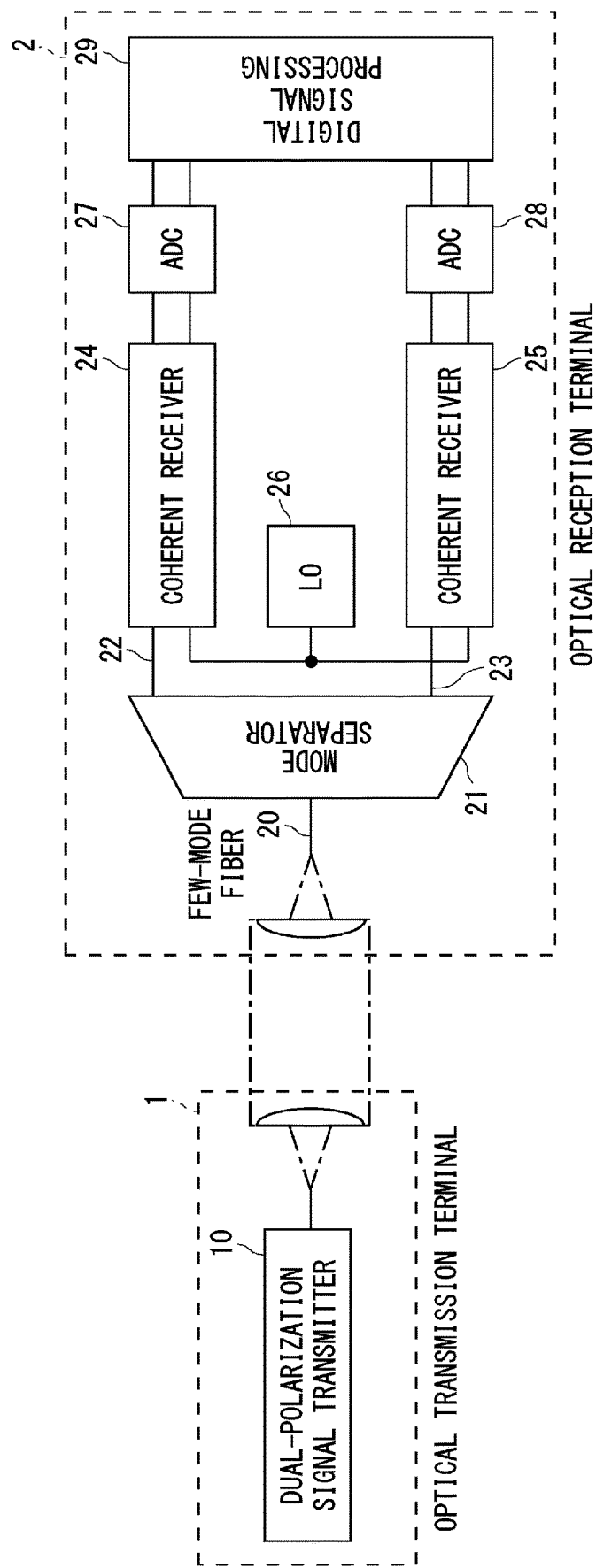
FIG. 4 is a view showing an example of the structure of an optical space communication system according to a first example embodiment of the present disclosure.

FIG. 4 is a view showing an example of the structure of an optical space communication system according to a first example embodiment of the present disclosure. The case where dual polarization QPSK signals are received by a mode diversity optical space communication receiver is described hereinafter as an example. Note that the present disclosure is applicable also to an aperture diversity optical space communication receiver using a plurality of telescope apertures.

An optical space communication system according to the first example embodiment includes an optical transmission terminal 1 that is mounted on a satellite or the like, and an optical reception terminal 2 that is located on the ground. The optical transmission terminal 1 includes a dual-polarization signal transmitter 10, and it is an example of an optical transmission device. The optical reception terminal 2 includes a few-mode fiber 20, a mode separator 21, SMFs 22 and 23, coherent receivers 24 and 25, a local light source 26, ADCs (Analog-to-Digital Converters) 27 and 28, and a digital signal processing unit 29, and it is an example of an optical reception device.

The dual-polarization signal transmitter 10 of the optical transmission terminal 1 transmits an optical signal (dual-polarization signal), and this optical signal propagates through the air, and is then received by the optical reception terminal 2. In the optical reception terminal 2, the optical signal is collected on and coupled to the few-mode fiber 20, and the optical signal coupled to each propagation mode of the few-mode fiber 20 is separated by the mode separator 21, and is then guided to the SMF 22 or 23. It is assumed that the number of propagation modes of the few-mode fiber 20 is two. Although mode coupling and mode dispersion between modes can occur in the mode separator 21, it is assumed that the mode coupling and the mode dispersion are small in this example. Stationary mode coupling may be considered to be included in the effect of atmospheric turbulence. Two optical signals corresponding to the respective modes guided to the SMFs 22 and 23 are mixed with local light generated in the local light source 26 and coherently received by the dual-polarization coherent receivers 24 and 25. After that, the two optical signals are sampled by the ADCs 27 and 28, and then undergo digital signal processing performed by the digital signal processing unit 29. Although total four signals, i.e., I (in-phase) components and Q (quadrature components) of each of x-polarization and y-polarization, are output from one of the dual-polarization coherent receivers 24 and 25, those four signals are shown as two signals in FIG. 4 by collecting the four signals in a complex number for each polarization. The sampling rate of the ADCs 27 and 28 is over sampling at twice the symbol rate.

Figure 5:
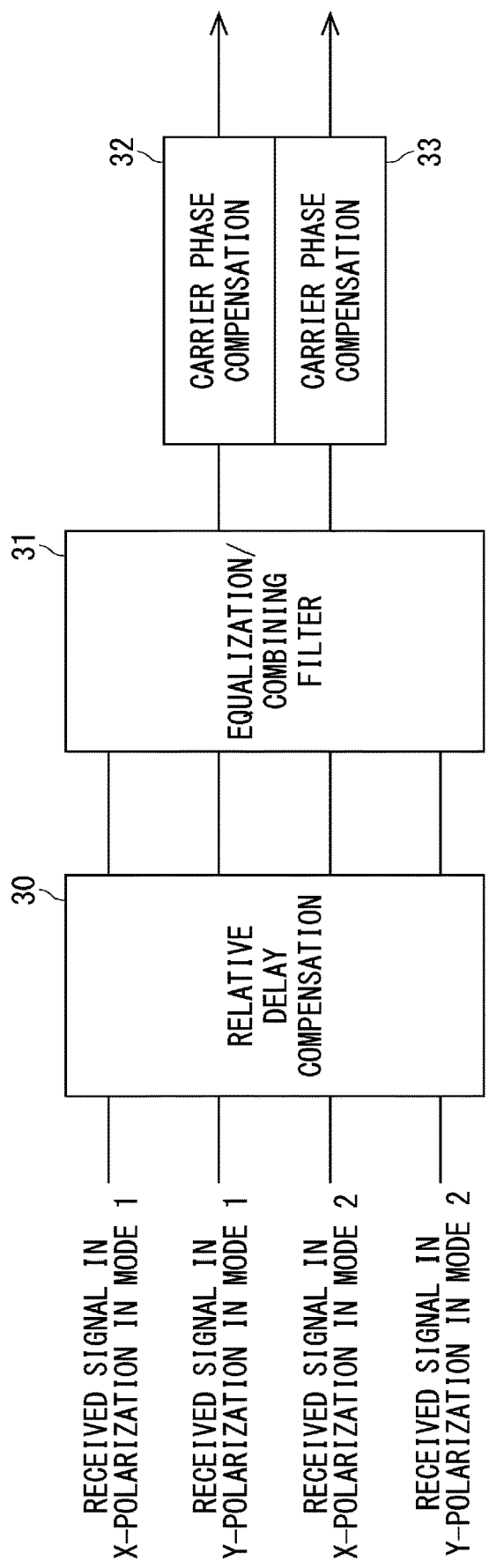
FIG. 5 is a block diagram showing an example of the structure of a digital signal processing unit that performs polarization separation and diversity combining according to the first example embodiment of the present disclosure.

FIG. 5 is a block diagram showing an example of the block structure of the digital signal processing unit 29 according to the first example embodiment of the present disclosure.

The digital signal processing unit 29 according to the first example embodiment of the present disclosure includes a relative delay compensation unit 30, an equalization/combining filter 31, and carrier phase compensation units 32 and 33.

A relative delay between the x- and y-polarization received signals in each of Modes 1 and 2 are first broadly compensated by the relative delay compensation unit 30. Since the x- and y-polarization received signals in each mode are signals obtained by mixing dual-polarization signals transmitted from the optical transmission terminal 1 with respect to polarization, it is difficult to accurately detect the relative delay between polarizations. The compensation of a relative delay in the relative delay compensation unit 30 is processing that removes the relative delay between Modes 1 and 2 by using the correlation of waveforms of the total intensity of the x- and y-polarization received signals in each mode. After that, the four received signals in two polarizations and two modes from which the relative delay has been broadly removed are input to the equalization/combining filter 31 to undergo the polarization separation and the diversity combining, and two signals in two polarizations are output. After that, carrier phase compensation is performed by the carrier phase compensation units 32 and 33 on the two signals in two polarizations output from the equalization/combining filter 31, and thereby demodulation is completed. The carrier phase compensation units 32 and 33 may be incorporated into the equalization/combining filter 31 in some algorithms used, such as when using a Decision Directed Least Mean Square algorithm for control of the filter coefficients of the equalization/combining filter 31. Decoding processing such as symbol detection and error correction is performed on the demodulated signal, and thereby the data transmitted from the optical transmission terminal 1 is acquired.

Figure 6:
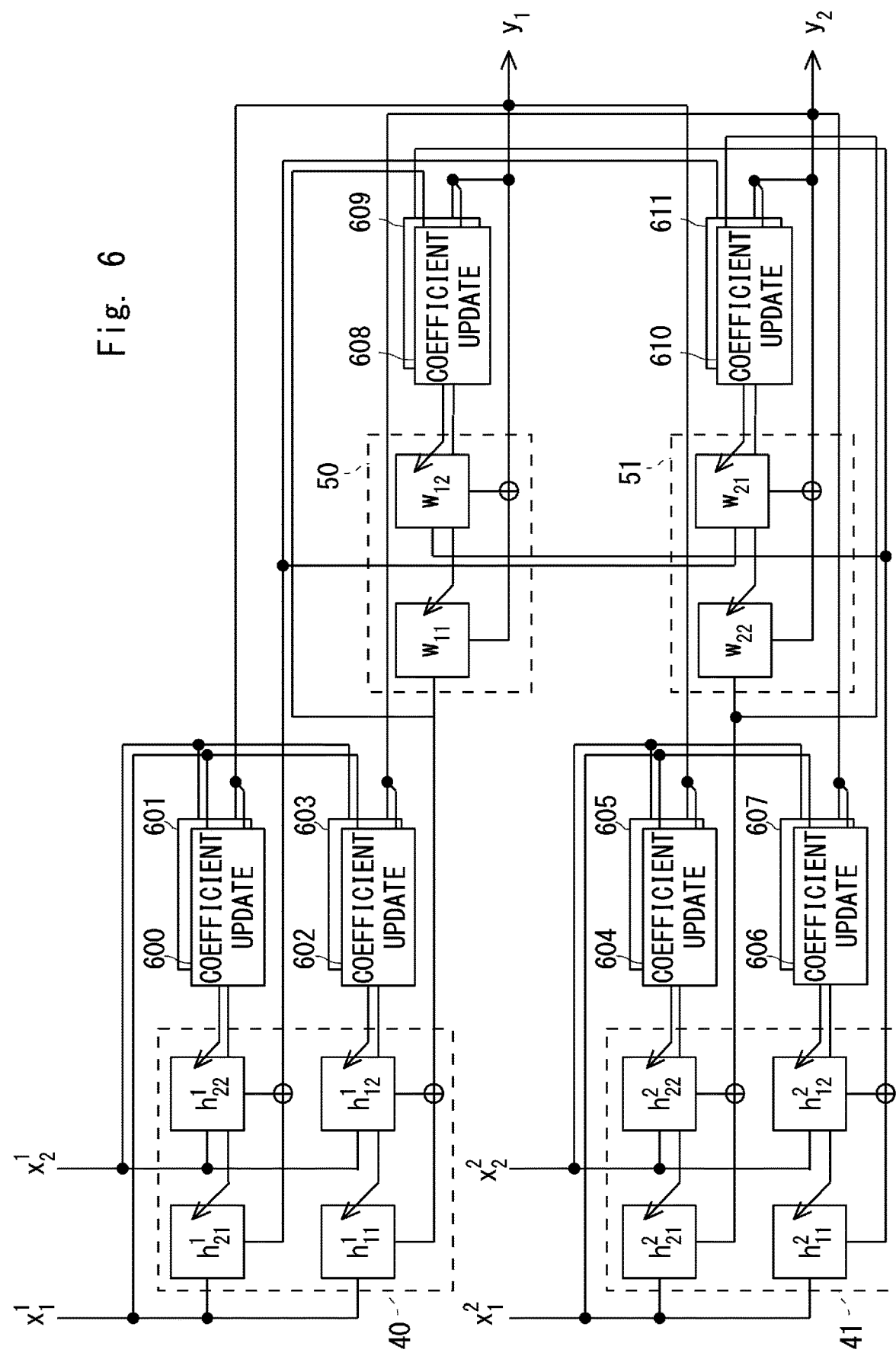
FIG. 6 is a view showing an example of the structure of an equalization/combining filter according to the first example embodiment of the present disclosure.

FIG. 6 is a view showing an example of the structure of the equalization/combining filter 31 according to the first example embodiment of the present disclosure. The equalization/combining filter 31 includes matrix filters 40 and 41 provided for each mode, combining filters 50 and 51 provided for each polarization, and coefficient update units 600 to 611.

Four signals in two polarizations in two modes are input to the equalization/combining filter 31. First, polarization separation and equalization are performed for each mode on the four signals in two polarizations in two modes by the matrix filters 40 and 41. To be specific, the matrix filter 40 performs the polarization separation and the equalization on the two signals in two polarizations in Mode 1, and the matrix filter 41 performs the polarization separation and the equalization on the two signals in two polarizations in Mode 2. Next, the signals on which the polarization separation and the equalization have been performed are weighted and combined for each polarization by the combining filters 50 and 51. To be specific, the combining filter 50 combines the x-polarization signals, out of the signals output from the matrix filters 40 and 41, after weighting them by weighting coefficients $w_{11}$ and $w_{12}$, respectively, and the combining filter 51 combines the y-polarization signals, out of the signals output from the matrix filters 40 and 41, after weighting them by weighting coefficients $w_{21}$ and $w_{22}$, respectively. As a result, two signals in two polarizations are output from the equalization/combining filter 31.

An input signal in polarization q (q=1 (x-polarization), 2 (y-polarization)) in Mode p (p=1, 2) is $x_q^p$.

Further, a filter that constitutes the matrix filters 40 and 41, which is a filter for Mode p, is $h_{qr}^p$ (r=1, 2), and it is an $N_h$ tap T/2 FIR filter.

When $$x_q^{pj} = x_q^p[k-j+1], h_{qr}^{pj} = h_{qr}^p[j]$$

(j=1, ..., $N_h$), and $$x_q^p = (x_q^{p1}, \ldots, x_q^{pN_h})^t, h_{qr}^p = (h_{pq}^{p1}, \ldots, h_{pq}^{pN_h})^t,$$

the output $z_q^p$ of the matrix filters 40 and 41 is:

$$z_q^p = \sum_{j,r} h_{qr}^{pj} x_r^{pj}.$$

These are weighed and combined for each polarization by the combining filters 50 and 51. As a result, the output $y_q$ is:

$$y_q = \sum_p w_{qp} z_q^p.$$

While the number of filter coefficients of the matrix filters 40 and 41 is as large as $4 \times N_h \times N_d$ when the number of modes to be combined is $N_d$, the number of weighting coefficients of the combining filters 50 and 51 is as small as $2 \times N_d$. Those filter coefficients and weighting coefficients are controlled by the coefficient update units 600 to 611 based on the deviation from a desired state of the both signals $y_q$ in two polarizations after combining by the combining filters 50 and 51, so as to minimize the sum of the deviations. In this example, CMA is used as a method of coefficient control by the coefficient update units 600 to 611. In the CMA, the intensity of the output $y_r$ is a constant value (1 in this example) in a desired state. Thus, the deviation of the output $y_p$ from this desired state is $$\varepsilon_q = 1 - |y_q|^2,$$

and the coefficients are controlled to minimize the sum of the deviations $$\varepsilon_{tot} = \sum_q \varepsilon_q^2.$$

Since the coefficient update rule by the stochastic gradient descent algorithm for a coefficient ξ is $$\xi \to \xi - \alpha \frac{\partial \varepsilon_{tot}}{\partial \xi},$$

the coefficient update rules of the filter coefficients of the matrix filters 40 and 41 and the weighting coefficients of the combining filters 50 and 51 are:

$$h_{qr}^p \to h_{qr}^p + \mu \varepsilon_q y_q w_{qp}^* (x_r^p)^*$$

$$w_{qp} \to w_{qp} + \mu_w \varepsilon_q y_q (z_q^p)^*$$

where μ and $\mu_w$ are parameters for determining the step size of the update of the filter coefficients of the matrix filters 40 and 41 and the weighting coefficients of the combining filters 50 and 51, respectively.

Figure 7:
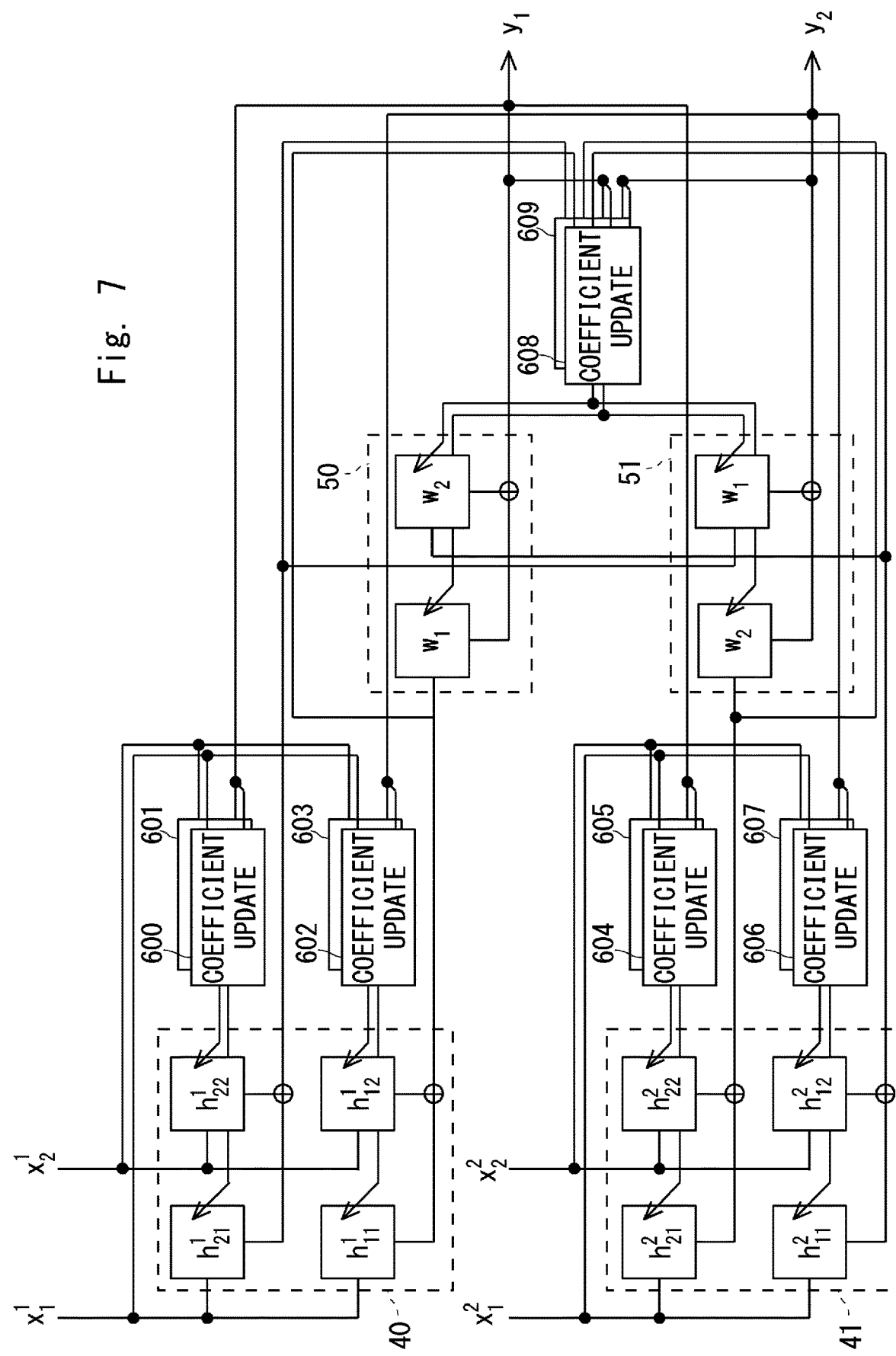
FIG. 7 is a view showing another example of the structure of an equalization/combining filter according to the first example embodiment of the present disclosure.

Further, since it is generally considered that the variation of the effect and the polarization state depending on polarization caused by atmospheric propagation are small in optical space communication, the weighting coefficients of the combining filters 50 and 51 may be common for polarization. This reduces the number of weighting coefficients to $N_d$, which is half. FIG. 7 is a view showing an example of the structure of such an equalization/combining filter. The combining filters 50 and 51 have weighting coefficients $w_1$ and $w_2$, which are common for polarization. The output of the filters is:

$$y_q = \sum_p w_p z_q^p.$$

The coefficients of the matrix filters and the combining filters are controlled by the coefficient update units 600 to 609 based on the deviation from a desired state of the both signals $y_q$ in two polarizations in the same manner so as to minimize the sum of the deviations. The coefficient update rules are:

$$h_{qr}^p \to h_{qr}^p + \mu \varepsilon_q y_q w_p^* (x_r^p)^*$$

$$w_p \to w_p + \mu_w \sum_q \varepsilon_q y_q (z_q^p)^*$$

In addition to this coefficient update, control may be performed to approximate the norm of those coefficients to a certain value.

Although the degeneracy of the same signals at the output can occur in such blind adaptive equalization, the same countermeasures as those used in optical fiber communication are applicable because the matrix filters 40 and 41 for Mode p have the same structure as typical polarization separation filters used in optical fiber communication.

As described above, according to the first example embodiment, polarization separation and equalization are first performed for each mode on four signals in two polarizations in two modes by the matrix filters 40 and 41. Next, the signals output from the matrix filters 40 and 41 are weighted by a weighting coefficient which is common for polarization and combined for each polarization by the combining filters 50 and 51. Then, the filter coefficients of the matrix filters 40 and 41 and the weighting coefficients of the combining filters 50 and 51 are controlled based on the deviation from a desired state of the both signals in two polarizations after combining by the combining filters 50 and 51, so as to minimize the sum of the deviations.

In the structure according to the first example embodiment, while the number of filter coefficients of the matrix filters 40 and 41 that perform polarization separation and equalization is large, the combining filters 50 and 51 that perform weighting and combining have only a small number of weighting coefficients corresponding to the number of modes. Since it is considered that the variation of the effect and the polarization state depending on polarization caused by atmospheric propagation are small in optical space communication, the variation of polarization is caused by propagation through an optical fiber. In the case of the first example embodiment, an optical fiber is locally used only for a short distance in the optical transmission terminal 1 and the optical reception terminal 2, and therefore the rate of the polarization variation is expected to be lower compared with long-distance optical fiber communication or the like. Further, the incompleteness of the coherent receivers 24 and 25 can be regarded as being static. Thus, no problem arises even when coefficient control of the filter coefficients of the matrix filters 40 and 41 is slow. Therefore, the update step size of the filter coefficients of the matrix filters 40 and 41 can be small, and the interval of update may be once in a plurality of symbols, which enables significant reduction of circuit resources required for implementation. On the other hand, the weighting coefficients of the combining filters 50 and 51 need to be controlled to follow the variation of rapid atmospheric turbulence, and therefore rapid control is required. It is therefore desirable to set the update step size to large and the interval of update to as short as possible. In the structure according to the first example embodiment, only a small number of weighting coefficients for weighting in the combining filters 50 and 51 are controlled rapidly, which achieves digital signal processing that performs the polarization separation and the diversity combining that rapidly follows the variation of atmospheric turbulence. Further, the filter coefficients of the matrix filters 40 and 41 and the weighting coefficients of the combining filters 50 and 51 are controlled based on the deviation from a desired state of the both signals in two polarizations after combining by the combining filters 50 and 51, so as to minimize the sum of the deviations. This avoids a problem that, when performing the polarization separation independently for each mode, the polarization separation does not work if the characteristics of signals received in each mode are low, failing to obtain a sufficient gain of the diversity combining.

(2) Second Example Embodiment

In the first example embodiment of the present disclosure, the matrix filters 40 and 41 that perform the polarization separation and the equalization for each mode are used. In the case where time spreading due to the incompleteness, such as a lack of bandwidth, of the coherent receivers 24 and 25 is relatively larger than time spreading due to polarization mode dispersion or mode dispersion in the mode separator, equalization filters 70 and 71 having sufficient time spreading to compensate this time spreading are provided in the previous stage of the matrix filters 40 and 41 in order to reduce the time spreading of the matrix filters 40 and 41 (i.e., reduce the number of taps in the case of FIR filters). This can further reduce necessary circuit resources.

Figure 8:
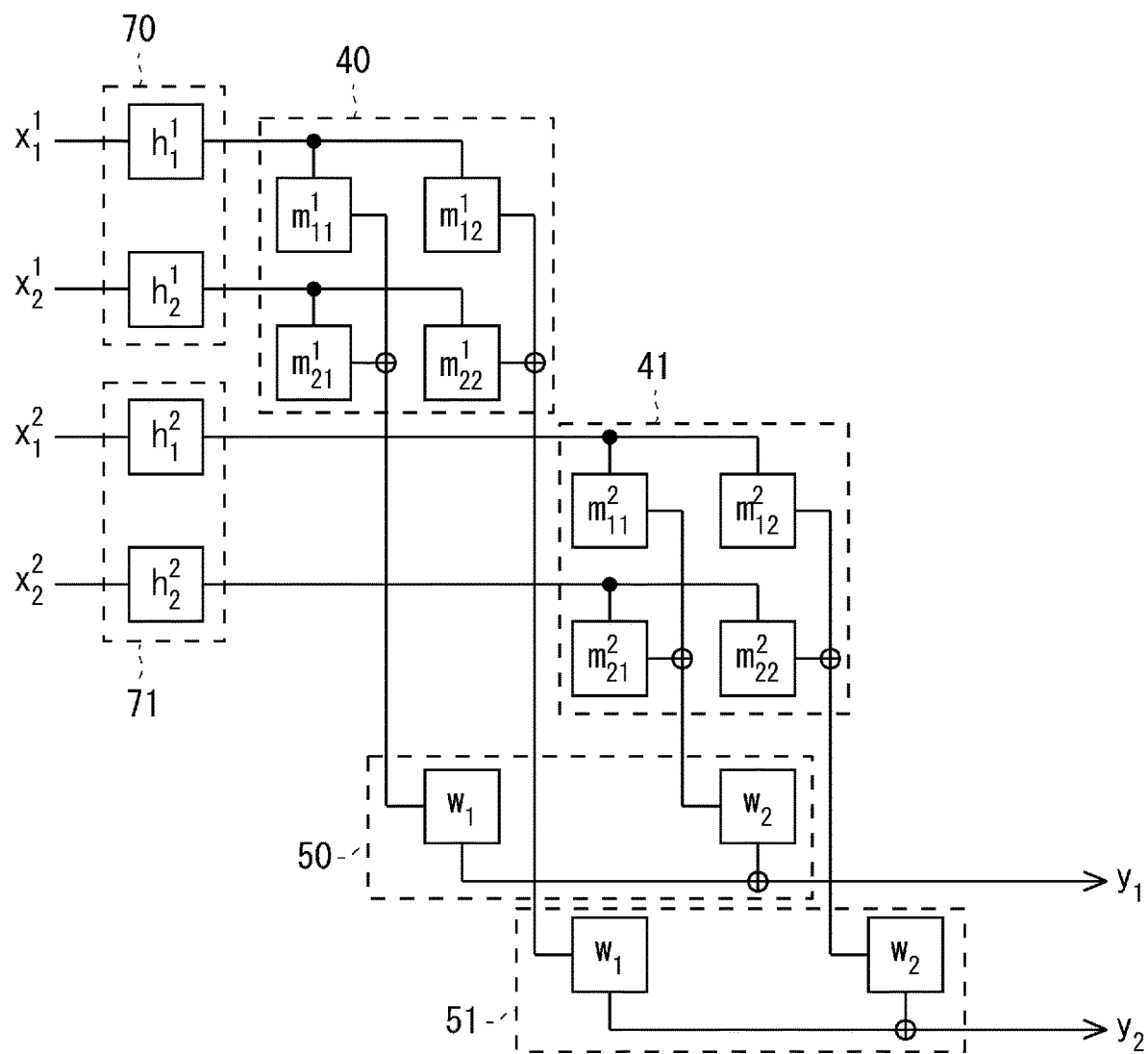
FIG. 8 is a view showing an example of the structure of a digital signal processing unit that performs polarization separation and diversity combining according to a second example embodiment of the present disclosure.

FIG. 8 is a view showing an example of the structure of the digital signal processing unit 29 that performs polarization separation and diversity combining in this way. Parts relevant to the coefficient control are omitted to simplify the drawing. Note that, however, the filter coefficients of the matrix filters 40 and 41, the weighting coefficients of the combining filters 50 and 51, and the filter coefficients of the equalization filters 70 and 71 are all controlled based on the deviation from a desired state of both signals in two polarizations after combining by the combining filters 50 and 51, so as to minimize the sum of the deviations, just like in the first example embodiment.

An input signal in polarization q (q=1 (x-polarization), 2 (y-polarization)) in Mode p (p=1, 2) is $x_q^p$, and filter processing is performed on this signal by a filter $h_q^p$ that constitutes the equalization filters 70 and 71. The filter $h_q^p$ is an $N_h$ tap T/2 FIR filter.

When $$x_q^{pj}=x_q^p[k-j+1], h_q^{pj}=h_q^p[j]$$

(j=1, . . . , $N_h$), and $$x_q^p = \left(x_q^{p1}, \ldots , x_q^{pN_h}\right)^t, h_q^p = \left(h_q^{p1}, \ldots , h_q^{pN_h}\right)^t,$$

the output $u_q^p$ of the equalization filters 70 and 71 is:

$$u_q^p = \sum_j h_q^{pj} x_q^{pj}.$$

This is input to the matrix filters 40 and 41. A filter that constitutes the matrix filters 40 and 41, which is a filter for Mode p, is $m_{qr}^p$ (r=1, 2), and it is an $N_m$ tap T/2 FIR filter. When $$u_q^{pj}=u_q^p[k-j+1], m_{qr}^{pj}=m_{qr}^p[j]$$

(j=1, . . . , $N_m$), and $$u_q^p = (u_q^{p1}, \ldots , u_q^{pN_m})^t, m_{qr}^p = (m_{qr}^{p1}, \ldots , m_{qr}^{pN_m})^t,$$

the output $z_q^p$ of the matrix filters 40 and 41 is:

$$z_q^p = \sum_{j,r} m_{qr}^{pj} u_r^{pj}.$$

These are weighted by a weighting coefficient $w_p$ which is common for polarization and combined by the combining filters 50 and 51. As a result, the output $y_q$ is:

$$y_q = \sum_p w_p z_q^p.$$

The filter coefficients of the matrix filters 40 and 41, the weighting coefficients of the combining filters 50 and 51, and the filter coefficients of the equalization filters 70 and 71 are all controlled by a coefficient update unit based on the deviation from a desired state of the both signals $y_q$ in two polarizations after combining by the combining filters 50 and 51, so as to minimize the sum of the deviations. Coefficient control of the filter coefficients of the equalization filters 70 and 71 and the matrix filters 40 and 41 can be slow, and coefficient control of the weighting coefficients of the combining filters 50 and 51 is performed rapidly. The coefficient update rules when using CMA as a method of coefficient control are:

$$h_q^p \to h_q^p + \mu \sum_{j,r} \varepsilon_r y_r w_p^* (m_{rq}^{pj})^* (x_q^p)^*$$

$$m_{qr}^p \to m_{qr}^p + \mu \varepsilon_q y_q w_p^* (u_r^p)^*$$

$$w_p \to w_p + \mu_w \sum_q \varepsilon_q y_q (z_q^p)^*.$$

When the number of modes to be combined is $N_d$, the number of filter coefficients of the equalization filters 70 and 71 is $2 \times N_h \times N_d$, the number of filter coefficients of the matrix filters 40 and 41 is $4 \times N_h \times N_d$, and the number of weighting coefficients of the combining filters 50 and 51 is $N_m$. It is assumed that $N_m$ can be smaller than $N_h$. Thus, when the value of $N_h$ is large, the number of filter coefficients of the equalization filters 70 and 71 and the matrix filters 40 and 41 in total can be smaller than the number in the first example embodiment.

Although the matrix filters 40 and 41 perform the polarization separation and the equalization for each mode in the example of FIG. 8, they may be configured to be able to perform compensation for mode coupling. Since stationary and unitary mode coupling distributes optical signals to each mode at the total intensity equal to the total intensity of optical signals before coupling, this can be considered to be included in the effect of atmospheric turbulence. On the other hand, if the matrix filters 40 and 41 are configured to be able to compensate mode coupling, the characteristics of the mode separator 21 can be directly reflected on the initial value of the filter coefficients of the matrix filters 40 and 41, for example.

Figure 9:
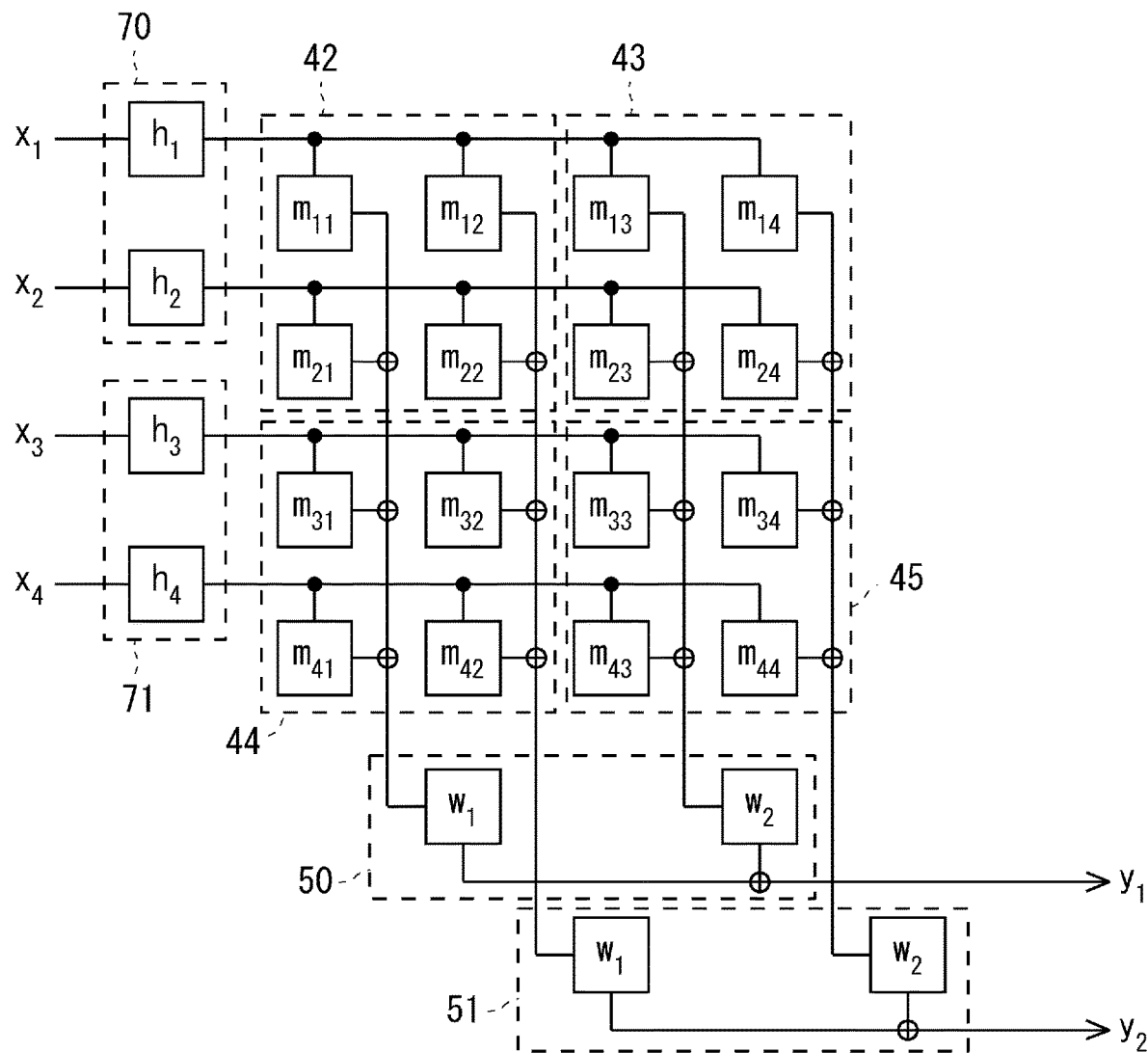
FIG. 9 is a view showing another example of the structure of a digital signal processing unit that performs polarization separation and diversity combining according to the second example embodiment of the present disclosure.

FIG. 9 is a view showing an example of the structure of the digital signal processing unit 29 that performs polarization separation and diversity combining in this way. Parts relevant to the coefficient control are omitted to simplify the drawing just like in FIG. 8. Note that, however, the filter coefficients of matrix filters 42 to 45, the weighting coefficients of the combining filters 50 and 51, and the filter coefficients of the equalization filters 70 and 71 are all controlled based on the deviation from a desired state of both signals in two polarizations after combining by the combining filters 50 and 51, so as to minimize the sum of the deviations, just like in FIG. 8. Further, in FIG. 9, indices are changed as follows: an input signal in x-polarization in Mode 1 is $x_1$, an input signal in y-polarization in Mode 1 is $x_2$, an input signal in x-polarization in Mode 2 is $x_3$, and an input signal in y-polarization in Mode 2 is $x_4$. The coefficient update rules when using CMA as a method of coefficient control are:

$$h_p \to h_p + \mu \sum_{j,q,r} \varepsilon_r y_r w_p^* (m_{(2q+r-2)p}^{j})^* (x_p)^*$$

-continued $$m_{(2p+q-2)r} \to m_{(2p+q-2)r} + \mu \varepsilon_q y_q w_p^* (u_r)^*$$

$$w_p \to w_p + \mu_w \sum_q \varepsilon_q y_q z_{2p+q-2}^*.$$

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

Although the optical reception terminal according to the present disclosure is described as a hardware structure in the above example embodiments, the present disclosure is not limited thereto. The present disclosure may be implemented by causing a processor such as a CPU (Central Processing Unit) to read and execute a computer program stored in a memory to perform given processing of the optical reception terminal.

In the above-described example, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The whole or part of the example embodiments disclosed above can be described as, but not limited to, the following supplementary notes.

(Supplementary Note 1)

An optical space communication system comprising:

an optical transmission device configured to transmit a dual-polarization signal; and an optical reception device configured to receive the dual-polarization signal transmitted from the optical transmission device in a plurality of modes with spatially different characteristics and perform diversity combining, wherein the optical reception device includes:

a plurality of dual-polarization coherent receivers respectively provided for the plurality of modes and configured to perform coherent reception on a signal coupled to a corresponding mode, a plurality of matrix filters respectively provided for a plurality of modes and configured to perform polarization separation and equalization on a signal coherently received by the coherent receiver in a corresponding mode, and two combining filters respectively provided for two polarizations in quadrature and configured to combine signals in corresponding polarization among signals output from the plurality of matrix filters after weighting the signals, and filter coefficients of the plurality of matrix filters and weighting coefficients of the two combining filters are controlled based on a deviation from a desired state of both signals in two polarizations after combining by the two combining filters, so as to minimize a sum of deviations.
(Supplementary Note 2)

The optical space communication system according to Supplementary Note 1, wherein the two combining filters combine signals in corresponding polarization among signals output from the plurality of matrix filters after weighting the signals by a weighting coefficient common for polarization.
(Supplementary Note 3)

The optical space communication system according to Supplementary Note 1 or 2, wherein the optical reception device further includes a plurality of equalization filters respectively in previous stages of the plurality of matrix filters, and filter coefficients of the plurality of matrix filters, weighting coefficients of the two combining filters, and filter coefficients of the plurality of equalization filters are controlled based on a deviation from a desired state of both signals in two polarizations after combining by the two combining filters, so as to minimize a sum of deviations.
(Supplementary Note 4)

The optical space communication system according to Supplementary Note 1 or 2, wherein the number of the weighting coefficients of the combining filters is equal to the number of the plurality of modes.
(Supplementary Note 5)

The optical space communication system according to Supplementary Note 3, wherein the number of the weighting coefficients of the combining filters is equal to the number of taps of a filter constituting the matrix filters.
(Supplementary Note 6)

The optical space communication system according to any one of Supplementary Notes 1 to 5, wherein the optical reception device controls the filter coefficients and the weighting coefficients by CMA (Constant Modulus Algorithm).
(Supplementary Note 7)

An optical reception device for receiving a dual-polarization signal transmitted from an optical transmission device in a plurality of modes with spatially different characteristics and performing diversity combining, comprising:

a plurality of dual-polarization coherent receivers respectively provided for the plurality of modes and configured to perform coherent reception on a signal coupled to a corresponding mode;

a plurality of matrix filters respectively provided for a plurality of modes and configured to perform polarization separation and equalization on a signal coherently received by the coherent receiver in a corresponding mode; and two combining filters respectively provided for two polarizations in quadrature and configured to combine signals in corresponding polarization among signals output from the plurality of matrix filters after weighting the signals, wherein filter coefficients of the plurality of matrix filters and weighting coefficients of the two combining filters are controlled based on a deviation from a desired state of both signals in two polarizations after combining by the two combining filters, so as to minimize a sum of deviations.
(Supplementary Note 8)

The optical reception device according to Supplementary Note 7, wherein the two combining filters combine signals in corresponding polarization among signals output from the plurality of matrix filters after weighting the signals by a weighting coefficient common for polarization.
(Supplementary Note 9)

The optical reception device according to Supplementary Note 7 or 8, further comprising:

a plurality of equalization filters respectively in previous stages of the plurality of matrix filters, wherein filter coefficients of the plurality of matrix filters, weighting coefficients of the two combining filters, and filter coefficients of the plurality of equalization filters are controlled based on a deviation from a desired state of both signals in two polarizations after combining by the two combining filters, so as to minimize a sum of deviations.
(Supplementary Note 10)

The optical reception device according to Supplementary Note 7 or 8, wherein the number of the weighting coefficients of the combining filters is equal to the number of the plurality of modes.
(Supplementary Note 11)

The optical reception device according to Supplementary Note 9, wherein the number of the weighting coefficients of the combining filters is equal to the number of taps of a filter constituting the matrix filters.
(Supplementary Note 12)

An optical reception method by an optical reception device for receiving a dual-polarization signal transmitted from an optical transmission device in a plurality of modes with spatially different characteristics and performing diversity combining, comprising:

performing coherent reception on a signal coupled to a corresponding mode for each of the plurality of modes;

performing, by a plurality of matrix filters, polarization separation and equalization on a coherently received signal in a corresponding mode for each of a plurality of modes; and combining, by two combining filters, signals in corresponding polarization among signals output from the plurality of matrix filters after weighting the signals for each of two polarizations in quadrature, wherein filter coefficients of the plurality of matrix filters and weighting coefficients of the two combining filters are controlled based on a deviation from a desired state of both signals in two polarizations after combining by the two combining filters, so as to minimize a sum of deviations.
(Supplementary Note 13)

The optical reception method according to Supplementary Note 12, wherein signals in corresponding polarization among signals output from the plurality of matrix filters are combined by the two combining filters after being weighted by a weighting coefficient common for polarization.
(Supplementary Note 14)

The optical reception method according to Supplementary Note 12 or 13, wherein a plurality of equalization filters are placed respectively in previous stages of the plurality of matrix filters in the optical reception device, and filter coefficients of the plurality of matrix filters, weighting coefficients of the two combining filters, and filter coefficients of the plurality of equalization filters are controlled based on a deviation from a desired state of both signals in two polarizations after combining by the two combining filters, so as to minimize a sum of deviations.
(Supplementary Note 15)

The optical reception method according to Supplementary Note 12 or 13, wherein the number of the weighting coefficients of the combining filters is equal to the number of the plurality of modes.

(Supplementary Note 16)

The optical reception method according to Supplementary Note 14, wherein the number of the weighting coefficients of the combining filters is equal to the number of taps of a filter constituting the matrix filters.

(Supplementary Note 17)

A non-transitory computer readable medium storing a program causing an optical reception device for receiving a dual-polarization signal transmitted from an optical transmission device in a plurality of modes with spatially different characteristics and performing diversity combining to execute:

a step of performing coherent reception on a signal coupled to a corresponding mode for each of the plurality of modes;

a step of performing, by a plurality of matrix filters, polarization separation and equalization on a coherently received signal in a corresponding mode for each of a plurality of modes;

a combining step of combining, by two combining filters, signals in corresponding polarization among signals output from the plurality of matrix filters after weighting the signals for each of two polarizations in quadrature; and a step of controlling filter coefficients of the plurality of matrix filters and weighting coefficients of the two combining filters based on a deviation from a desired state of both signals in two polarizations after combining by the two combining filters, so as to minimize a sum of deviations.

(Supplementary Note 18)

The non-transitory computer readable medium according to Supplementary Note 17, wherein the combining step combines, by the two combining filters, signals in corresponding polarization among signals output from the plurality of matrix filters after weighting the signals by a weighting coefficient common for polarization.

(Supplementary Note 19)

The non-transitory computer readable medium according to Supplementary Note 17 or 18, wherein a plurality of equalization filters are placed respectively in previous stages of the plurality of matrix filters in the optical reception device, and the non-transitory computer readable medium stores a program causing the optical reception device to further execute a step of controlling filter coefficients of the plurality of matrix filters, weighting coefficients of the two combining filters, and filter coefficients of the plurality of equalization filters based on a deviation from a desired state of both signals in two polarizations after combining by the two combining filters, so as to minimize a sum of deviations.

(Supplementary Note 20)

The non-transitory computer readable medium according to Supplementary Note 17 or 18, wherein the number of the weighting coefficients of the combining filters is equal to the number of the plurality of modes.

(Supplementary Note 21)

The non-transitory computer readable medium according to Supplementary Note 17 or 18, wherein the number of the weighting coefficients of the combining filters is equal to the number of taps of a filter constituting the matrix filters.

This application is based upon and claims the benefit of priority from Japanese patent application No. 2018-076849 filed on Apr. 12, 2018, the disclosure of which is incorporated herein in its entirety by reference.

REFERENCE SIGNS LIST

1 OPTICAL TRANSMISSION TERMINAL
2 OPTICAL RECEPTION TERMINAL
10 DUAL-POLARIZATION SIGNAL TRANSMITTER
20 FEW-MODE FIBER
21 MODE SEPARATOR
22, 23 SMF
24, 25 COHERENT RECEIVER
26 LOCAL LIGHT SOURCE
27, 28 ADC
29 DIGITAL SIGNAL PROCESSING UNIT
30 RELATIVE DELAY COMPENSATION UNIT
31 EQUALIZATION/COMBINING FILTER
32, 33 CARRIER PHASE COMPENSATION UNIT
40 to 45 MATRIX FILTER
50, 51 COMBINING FILTER
600 to 611 COEFFICIENT UPDATE UNIT
70, 71 EQUALIZATION FILTER

The invention claimed is:

1. An optical space communication system comprising:
an optical transmission device configured to transmit a dual-polarization signal; and
an optical reception device configured to receive the dual-polarization signal transmitted from the optical transmission device in a plurality of modes with spatially different characteristics and perform diversity combining, wherein
the optical reception device includes:
a plurality of dual-polarization coherent receivers respectively provided for the plurality of modes and configured to perform coherent reception on a signal coupled to a corresponding mode,
a plurality of matrix filters respectively provided for a plurality of modes and configured to perform polarization separation and equalization on a signal coherently received by the coherent receiver in a corresponding mode, and
two combining filters respectively provided for two polarizations in quadrature and configured to combine signals in corresponding polarization among signals output from the plurality of matrix filters after weighting the signals;
filter coefficients of the plurality of matrix filters and weighting coefficients of the two combining filters being controlled based on a deviation from a desired state of both signals in two polarizations after combining by the two combining filters, so as to minimize a sum of deviations.

2. The optical space communication system according to claim 1, wherein the two combining filters combine signals in corresponding polarization among signals output from the plurality of matrix filters after weighting the signals by a weighting coefficient common for polarization.

3. The optical space communication system according to claim 1, wherein
the optical reception device further includes a plurality of equalization filters in respective previous stages of the plurality of matrix filters, and
filter coefficients of the plurality of matrix filters, weighting coefficients of the two combining filters, and filter coefficients of the plurality of equalization filters are controlled based on a deviation from a desired state of both signals in two polarizations after combining by the two combining filters, so as to minimize a sum of deviations.

4. The optical space communication system according to claim 1, wherein the number of the weighting coefficients of the combining filters is equal to the number of the plurality of modes.

5. The optical space communication system according to claim 3, wherein the number of the weighting coefficients of the combining filters is equal to the number of taps of a filter constituting the matrix filters.

6. The optical space communication system according to claim 1, wherein the optical reception device controls the filter coefficients and the weighting coefficients by CMA (Constant Modulus Algorithm).

7. An optical reception device for receiving a dual-polarization signal transmitted from an optical transmission device in a plurality of modes with spatially different characteristics and performing diversity combining, comprising:
- a plurality of dual-polarization coherent receivers respectively provided for the plurality of modes and configured to perform coherent reception on a signal coupled to a corresponding mode;
- a plurality of matrix filters respectively provided for a plurality of modes and configured to perform polarization separation and equalization on a signal coherently received by the coherent receiver in a corresponding mode; and
- two combining filters respectively provided for two polarizations in quadrature and configured to combine signals in corresponding polarization among signals output from the plurality of matrix filters after weighting the signals,
- wherein filter coefficients of the plurality of matrix filters and weighting coefficients of the two combining filters are controlled based on a deviation from a desired state of both signals in two polarizations after combining by the two combining filters, so as to minimize a sum of deviations.

8. The optical reception device according to claim 7, wherein the two combining filters combine signals in corresponding polarization among signals output from the plurality of matrix filters after weighting the signals by a weighting coefficient common for polarization.

9. The optical reception device according to claim 7, further comprising:
- a plurality of equalization filters in respective previous stages of the plurality of matrix filters,
- wherein filter coefficients of the plurality of matrix filters, weighting coefficients of the two combining filters, and filter coefficients of the plurality of equalization filters are controlled based on a deviation from a desired state of both signals in two polarizations after combining by the two combining filters, so as to minimize a sum of deviations.

10. The optical reception device according to claim 7, wherein the number of the weighting coefficients of the combining filters is equal to the number of the plurality of modes.

11. The optical reception device according to claim 9, wherein the number of the weighting coefficients of the combining filters is equal to the number of taps of a filter constituting the matrix filters.

12. An optical reception method performed by an optical reception device for receiving a dual-polarization signal transmitted from an optical transmission device in a plurality of modes with spatially different characteristics and performing diversity combining, comprising:
- performing coherent reception on a signal coupled to a corresponding mode for each of the plurality of modes;
- performing, by a plurality of matrix filters, polarization separation and equalization on a coherently received signal in a corresponding mode for each of a plurality of modes; and
- combining, by two combining filters, signals in corresponding polarization among signals output from the plurality of matrix filters after weighting the signals for each of two polarizations in quadrature,
- wherein filter coefficients of the plurality of matrix filters and weighting coefficients of the two combining filters are controlled based on a deviation from a desired state of both signals in two polarizations after combining by the two combining filters, so as to minimize a sum of deviations.

13. The optical reception method according to claim 12, wherein signals in corresponding polarization among signals output from the plurality of matrix filters are combined by the two combining filters after being weighted by a weighting coefficient common for polarization.

14. The optical reception method according to claim 12, wherein
- a plurality of equalization filters are placed in respective previous stages of the plurality of matrix filters in the optical reception device, and
- filter coefficients of the plurality of matrix filters, weighting coefficients of the two combining filters, and filter coefficients of the plurality of equalization filters are controlled based on a deviation from a desired state of both signals in two polarizations after combining by the two combining filters, so as to minimize a sum of deviations.

15. The optical reception method according to claim 12, wherein the number of the weighting coefficients of the combining filters is equal to the number of the plurality of modes.

16. The optical reception method according to claim 14, wherein the number of the weighting coefficients of the combining filters is equal to the number of taps of a filter constituting the matrix filters.

* * * * *